Nov. 16, 1937.　　　　T. ZUSCHLAG　　　　2,098,991
MAGNETIC ANALYSIS
Filed April 23, 1936
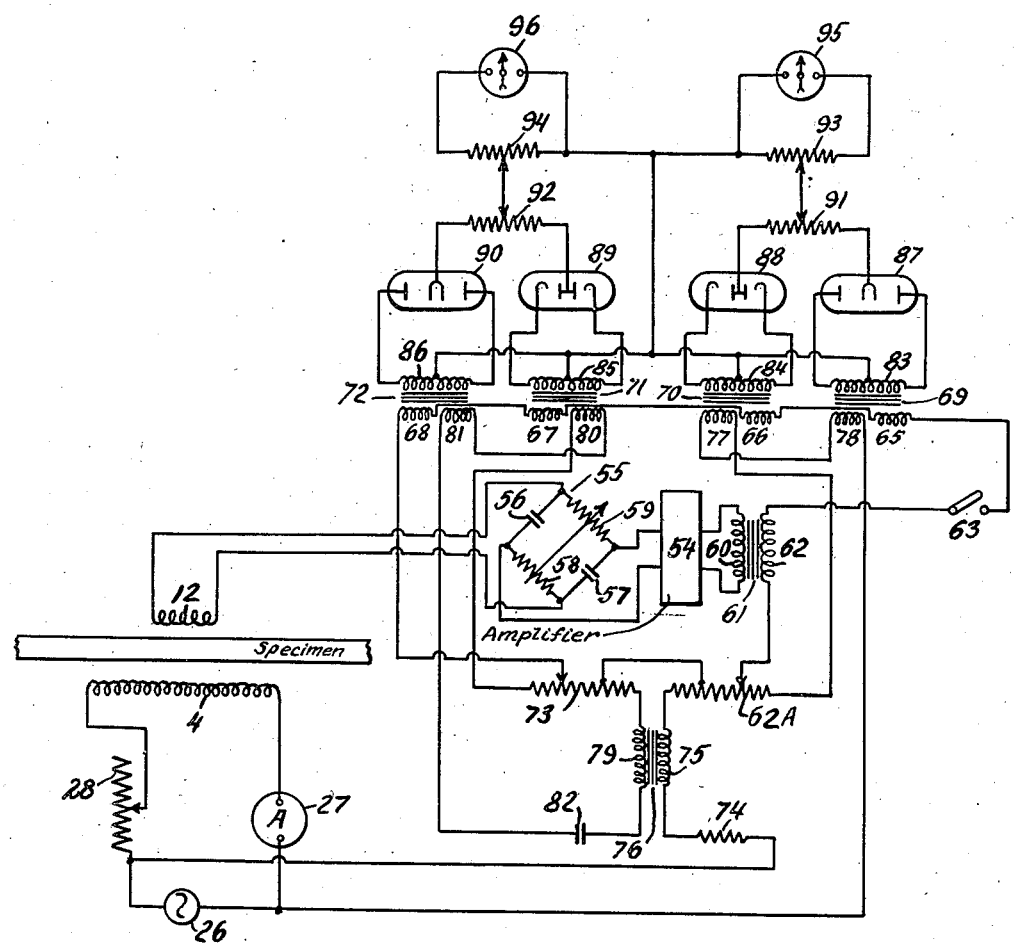
INVENTOR
*Theodor Zuschlag*
BY
*Pennie, Davis, Marvin and Edmonds*
ATTORNEYS Patented Nov. 16, 1937

2,098,991

UNITED STATES PATENT OFFICE 2,098,991

MAGNETIC ANALYSIS

Theodor Zuschlag, West Englewood, N. J., assignor to Magnetic Analysis Corporation, a corporation of New York Application April 23, 1936, Serial No. 75,945

8 Claims. (Cl. 175—183)

This invention is concerned with the determination of the metallurgical characteristics such as hardness, toughness, chemical analyses, etc., of magnetizable bodies and contemplates an improved apparatus whereby this information is obtained by magnetic means.

If a magnetizable body is introduced into inductive relationship with a secondary coil in which there is an induced alternating potential it will affect both the phase and amplitude of this potential. If this first potential is then opposed by a second potential of the same phase and amplitude, neutralization will occur and there will be no measurable resultant potential. If then the first magnetizable body is replaced by a second magnetizable body of different metallurgical characteristics a third potential differing from the first and second potential in either or both phase and amplitude may result. If the third and second potential are now opposed in a circuit either a phase conflict or a differential potential, or both, may arise. The presence of either a phase conflict or a differential potential then indicates that the second magnetizable body is magnetically or electrically different from the first magnetizable body.

Certain characteristics of magnetizable bodies are manifested chiefly by potential difference, and other characteristics bring about changes in the phase of an induced potential with a resultant differential current. Thus, differences in cross-section of magnetizable bodies ordinarily give rise to variations in the amplitude of an induced potential, whereas differences in hardness usually give rise to phase conflicts. When a comprehensive analysis is desired, it is necessary, therefore, to investigate changes in both amplitude and phase.

The instant apparatus facilitates the making of such an investigation.

Considered briefly, the apparatus comprises a primary exciter coil disposable in inductive relationship with a magnetizable body to be investigated, means for energizing the exciter coil with an alternating current, a secondary coil disposed in inductive relationship with the exciter coil, and a circuit connected to the secondary coil wherein auxiliary potentials may be introduced to neutralize a potential resulting from the secondary coil and wherein the phase of this potential may be varied. This circuit also contains mixing transformers which with appurtenant apparatus permit the observation of changes in amplitude or phase of the secondary coil potential due to a change in the metallurgical characteristics of a magnetizable body inductively associated with the secondary coil.

Considered in somewhat greater detail this circuit associated with the secondary coil contains a phase shifter whereby the phase of the induced potential of this coil may be varied at will, and also contains adjustable resistance means (for example, potentiometers) whereby two 90° phase displaced components may be introduced to neutralize the induced potential originating in the secondary coil whatever its phase may be.

In practice, a standard magnetizable body of known character is first placed in inductive relationship with the secondary coil and the exciter coil. By adjustment of the phase of the resultant induced potential, and by compensating the phase-adjusted potential by the introduction of the two 90° phase displaced auxiliary potentials a neutral condition is obtained, and there is no indication of potential in the circuit. If, thereafter, the standard magnetizable body is replaced by a magnetizable body which is metallurgically dissimilar, indicating devices in the circuit will immediately show the presence of a phase conflict or a change in the amplitude of the induced potential.

The apparatus will be more thoroughly understood in the light of the following detailed description, taken in conjunction with the accompanying single figure which is a wiring diagram of a presently preferred form of the apparatus of my invention.

Referring now to the figure it will be seen that an exciter coil 4 is connected in series with an alternating current source 26, preferably of constant potential and frequency, through an ammeter 27 and an adjustable resistance 28 for regulation purposes. Any suitable alternating current source may be used, but I prefer to employ a synchronous motor-generator set (not shown) with the motor connected to a commercial power line. In this way an exciter current of substantially constant voltage and frequency is obtained, line variations and surges being largely eliminated. In operation there is a potential of about 110 volts across the generator and the current in the exciter coil varies from 8 to 10 amperes depending upon the size of the material undergoing examination. The output of the generator should be single phase. Current of any commercial frequency may be used.

Disposed adjacent the exciter coil, and preferably concentrically within the exciter coil is a "specimen" secondary coil 12, in which is induced the potential to be investigated.

The artificial standard circuit

Alternating potentials set up in this coil 12 are, in effect, opposed in the circuit to a resultant alternating potential corresponding in phase and amplitude to the potential which should be set up in the coil 12 if the metallurgical characteristics of a specimen disclosed in the test coil assembly were those desired. When the two opposed potentials are equal in phase and amplitude, there is no resultant potential and no indication is given by the apparatus. If, however, the specimen in the test coil assembly does not have the desired magnetic or electrical characteristics, a differential potential will be set up, or there will be a phase shift between the two opposed potentials. In either case the apparatus will indicate the changed condition, and advise the operator to reject the specimen.

The "specimen" coil 12 is connected to a phase shifter 55. The phase shifter comprises a four-sided bridge. In two opposed sides of the bridge are disposed fixed condensers 56, 57. In the other two opposed sides of the bridge are disposed two adjustable resistors 58, 59, which may be adjusted simultaneously. The two corners of the phase shift bridge intermediate the connections to the "specimen" coil 12 are connected to the input side of an amplifier 54, the output leads of which are connected to a high impedance primary coil 60 of a matching transformer 61.

The amplifier is placed in the circuit to offset the voltage reduction in the matching transformer which would otherwise decrease the indications of metallurgical differences to an excessive degree. Any suitable type of voltage amplifier may be employed.

The apparatus contains four mixer transformers, numbered respectively, 69, 70, 71 and 72. Each transformer is provided with two primary coils, numbered respectively, 65 and 78, 66 and 77, 80 and 67, and 81 and 68. The function of these mixer transformers will be made clear hereinafter.

Continuing with the description of the circuit, the secondary coil 62 of the matching transformer is connected in series with a switch 63, and the primary coils 65, 66, 67 and 68, respectively, of the mixer transformers 69, 70, 71, 72. This series circuit is completed by a connection from primary coil 68 through the sliders and center-tap of a potentiometer 73, and the center-tap and slider of another potentiometer 62A.

Potential for the primary coils 78 and 77 of the mixing transformers 69 and 70, respectively, is supplied directly from the primary alternating current source 26 through a circuit which comprises a current limiting resistor 74, a primary coil 75 of a 90° phase shifting transformer 76, the potentiometer 62A through its ends, the coils 77 and 78 of the mixing transformers 70 and 69, and the alternating current source 26.

Potential for the primary coils 80 and 81 of the mixing transformers 71 and 72, respectively, is supplied from a secondary coil 79 of the phase shifting transformer 76 through a series circuit comprising the secondary coil 79 of the phase shifting transformer 76, the potentiometer 73 through its ends, the primary coil 80, the primary coil 81, and a tuning condenser 82. This tuning condenser is of such capacity as to cause a phase displacement of substantially 90 degrees between the currents in primary coil 75 of the phase shifting transformer and secondary coil 79 of this transformer.

Now considering the mixer transformers in detail, it will be seen that the primary coils 65, 66, 67, 68 of the mixing transformers 69, 70, 71 and 72, respectively, are connected in series addition and receive potential from the metallurgical coil 12 through the two matching transformers and the phase shift bridge. Two other potentials, 90° out of phase with each other may also enter this circuit through the potentiometers 62A and 73.

The primary coils 77 and 78 of the mixing transformers 70 and 69, respectively, receive primary current from the alternating current source 26, and are connected in series opposition with each other. The primary coils 80 and 81 of the mixing transformers 71, 72, respectively, receive electrical impulses 90° phase displaced from the primary potential through the secondary coil of the 90° phase shifting transformer and are connected to each other in series opposition.

Each of the mixing transformers 69, 70, 71, 72 is provided with a center-tap secondary coil numbered respectively 83, 84, 85 and 86. These secondary coils are connected to rectifier tubes 87, 88, 89 and 90, respectively, although the mode of connection is different. Thus, the mixing transformers 69 and 72 are connected to the plates of rectifier tubes 87 and 90, while ends of the secondary coils 84 and 85 of the mixing transformers 70, 71 are connected to the cathodes of rectifier tubes 88 and 89.

The two cathodes of the rectifier tube 87 are connected to the two plates of the rectifier tube 88 through the ends of a balancing potentiometer 91. The two plates of the rectifier tube 89 are connected to the two cathodes of the rectifier tube 90 through the ends of another balancing potentiometer 92. The slider of the balancing potentiometer 91 is connected to the slider of still another potentiometer 93, and the slider of the potentiometer 92 is connected to the slider of a fourth potentiometer 94. Potentiometers 93 and 94 are known as "sensitivity control" potentiometers. The two sensitivity control potentiometers are shunted, respectively, by a pair of zero center direct current galvanometers 95 and 96. The circuit containing the two potentiometers, the two sensitivity control potentiometers, the two zero center direct current galvanometers, the four rectifier tubes and the four secondary coils of the mixing transformers is completed by leads which connect an end of each sensitivity control potentiometer with the center point of each of the secondary coils 83, 84, 85, 86 of the mixing transformers.

The mode of operation of this artificial standard circuit and the functions of its various pieces of equipment will now be described.

It is first necessary to consider the action of the four mixing transformers. Taking, for example, the pair of mixing transformers 69 and 70, it will be seen that the primary coil 65 of the transformer 69 receives a current (designated hereinafter as X) from the secondary coil of the second matching transformer 61. This current is derived from electrical impulses set up in the specimen coil 12 through the matching transformer, the amplifier and the phase shifter bridge. The other primary coil 78 of the mixing transformer 69 receives a current (hereinafter designated as Y) directly from the alternating current source 26.

The currents X and Y are necessarily of the same frequency, but may be displaced from each other by a phase angle θ. The two primary coils 78 and 65 are as shown arranged so that their direction of winding is the same; in other words, they create an electromagnetic flux by addition. The secondary potential produced in the secondary coil 83 of this matching transformer is, therefore, proportional to the vector summation of the potentials in the primary coils 65 and 78.

Now considering the matching transformer, numbered 70, it will be seen that the same currents X and Y are also supplied to it, but inasmuch as its two primary coils 66 and 77 are wound oppositely, they create a resultant electromagnetic flux proportional to their difference and the secondary coil 84 of the matching transformer will have a potential proportional to the vector difference of the potentials in coils 66 and 77.

The secondary potentials of the mixing transformers 69 and 70 are both rectified and opposed to each other through the potentiometer 91. The galvanometer 95 thus produces a reading which is a function of the two primary potentials introduced into the two mixing transformers and also of the angular phase displacement θ between these two potentials. A more elaborate discussion of the functions of the mixing transformers is contained in my copending application Serial No. 33,855, filed July 30, 1935.

The two mixing transformers 71 and 72 with their appurtenant apparatus function in the same manner as the mixing transformers 69 and 70 as just described, except that a current $Y_1$, which is 90° out of phase with the current Y, is substituted. The result is that the reading of the galvanometer 96 is a function of the potential of current X, the potential of current $Y_1$ and an angle $θ_1$ representing the phase displacement between the two potentials.

The net result of the action of the four mixing transformers and the circuits connected to their secondaries is to indicate differences of two right angled components of the potential of current X from two other right angled components represented by the potentials of currents Y and $Y_1$. A metallurgical difference related to either a magnetic or an electrical variation may be manifested in either or both components of the potential of the current X.

By means of the phase shifter bridge 55 the phase of the current X derived from the secondary coil of the second matching transformer may be given any arbitrary value; and this current at any arbitrary phase may be completely compensated inasmuch as auxiliary potentials 90° phase displaced from each other may be introduced into the circuit containing the secondary coil of the second matching transformer through the potentiometers 73 and 62A. It is, therefore, possible to balance the electrical impulses in the artificial standard circuit by inter-related adjustment of the phase shifter bridge and the two potentiometers 62A and 73. Accordingly, by these adjustments and with a standard magnetizable specimen placed in inductive relationship with the specimen coil 12, the two galvanometers 95 and 96 both may be made to read zero. Thereafter, if this standard magnetizable specimen is replaced by one having different magnetic or electrical characteristics, these different characteristics will be indicated at either galvanometer and warn the operator that the material is not similar to the predetermined standard and should be rejected.

Operation of the apparatus

The adjustment of the metallurgical analysis circuit is made as follows:

With the switch 63 opened so that no potential is supplied to the coils 65, 66, 67, 68, of the respective mixing transformers, and with current being supplied to the coils 77, 78 of two mixer transformers directly from the alternating current source and to the primary coils 80 and 81 of the other mixer transformers from the secondary coil of the phase transformer, the galvanometers 95, 96 are made to read zero by adjusting the sliders of the potentiometers 91 and 92.

Next, with a standard specimen of known and desired character inserted substantially symmetrically in the test coil assembly, the switch 63 is closed so that all of the primary coils of the mixer transformers are energized. An electromotive force now has been set up in the "specimen" coil 12 and transferred through the matching transformers and the phase shifter bridge (which is set at an arbitrary point) to the secondary coil of the matching transformer 61. The electromotive force thus induced in the secondary or output coil of the matching transformer is then compensated by adjusting the position of the sliders on the potentiometers 62A and 73 until the two galvanometers again attain zero positions. Bearing in mind that the currents flowing through the potentiometers 62A and 73 are 90° phase displaced from each other it will be clear that the electromotive force in the secondary of the second matching transformer has now been compensated with regard to these two components.

The artificial standard circuit is now ready to operate. If the standard specimen is now replaced by a second and metallurgically dissimilar specimen in the test coil, the dissimilarity will be indicated by either or both of the galvanometers and the unsatisfactory material may be rejected by the operator. This method of operation, however, merely indicates some magnetic or electrical dissimilarity. While satisfactory in many instances, as for example when it is necessary to sort a mixed lot of bars which look alike but are metallurgically or chemically different, this method of operation does not permit the determination of a particular type of metallurgical variation. When a particular type of metallurgical variation is sought, the following preliminary steps are taken:

Assuming that it is desired to determine the hardness of strip material, a good strip having all desired characteristics is first placed in the test coil assembly, and with the phase shifter bridge set arbitrarily (as described hereinbefore) the potentiometers 62A and 73 are adjusted until the galvanometers read zero. Then the good strip is replaced by one of the same kind except that it is excessively hard. This will probably cause a deflection at both galvanometers. The deflection of one of the galvanometers (say 95) is reduced to zero by adjusting the phase shifter bridge. The hard strip is then replaced by the good strip and the two galvanometers are again brought to zero position by adjusting the potentiometers 62A and 73. The procedure is repeated until the hard strip produces deflections at one galvanometer (say 96) and no deflection at the other (say 95), without requiring a shift of the potentiometers 62A and 73 to attain zero readings on the galvanometers when the hard bar is replaced by the good bar.

Bars to be inspected may now be passed through the test coil assembly at high speed. At high operating speed, flaws and short strain variations in magnetizable material are usually not indicated by the galvanometers in the artificial standard circuit because the indicating impulses are of too short duration to cause movement of the galvanometers. Metallurgical dissimilarities, however, are usually manifested throughout the entire length of a bar or other specimen, so that the galvanometers have sufficient time to note a deflection due to these causes.

I claim:

1. In a magnetic analysis apparatus the combination which comprises an exciter coil disposable in inductive relationship with a magnetizable body, means for energizing the exciter coil with an alternating current, a secondary coil disposed in inductive relationship with the exciter coil and connected to a circuit containing an adjustable phase shifter and means for introducing into the circuit a plurality of auxiliary alternating potentials of the same frequency as that supplied to the exciter coil but displaced from each other by substantially constant phase angles, and means for determining changes of phase and amplitude of an alternating potential in said circuit.

2. Apparatus in accordance with claim 1 wherein the means through which the auxiliary potentials introduced into the circuit are a plurality of center tap potentiometers provided with sliders and having their ends connected to sources of auxiliary potentials and their center taps and sliders connected to the circuit.

3. Apparatus in accordance with claim 1 wherein the means for determining the changes in phase and amplitude of the potential in the circuit comprises a plurality of mixing transformers to the primary coils of which are supplied the potential undergoing investigation and the auxiliary potentials, rectifiers connected with the secondary coils of the mixing transformers, and a plurality of direct current galvanometers connected respectively to the rectifiers.

4. In a magnetic analysis apparatus provided with an exciter coil and a secondary coil disposed in inductive relationship therewith and adapted to produce an induced alternating potential influenced by a magnetizable body placed in inductive relationship therewith, the improvement which comprises a circuit connected to the secondary coil, means operatively associated with said circuit for shifting the phase of a potential in said circuit, means for introducing two auxiliary potentials 90° phase displaced from each other into the circuit containing the phase-shifted potential, an even number of mixing transformers provided with multiple primary coils and with secondary coils, means for introducing the phase-shifted potential into a primary coil of each mixing transformer, means for introducing one auxiliary potential into primary coils in half of the mixing transformers, means for introducing the other auxiliary potentials into primary coils of the other half of the mixing transformers, rectifiers connected with the secondary coils of the mixing transformers, and direct current galvanometers connected to the rectifiers.

5. In a magnetic analysis apparatus containing an exciter coil disposable in inductive relationship with a magnetizable body, means for energizing the exciter coil with alternating current, and a secondary coil disposed in inductive relationship with the exciter coil, the improvement which comprises a phase shifter connected to the secondary coil, an amplifier connected to said phase shifter, a matching transformer having its primary connected to said amplifier and its secondary connected with an electrical circuit, means for introducing two auxiliary potentials phase displaced from each other by a substantially constant phase angle into said circuit, and means for indicating a change in the potential in said circuit.

6. Apparatus in accordance with claim 5 wherein the auxiliary potentials supplied to the circuit are derived from the alternating current employed to energize the exciter coil.

7. Apparatus in accordance with claim 5 wherein the circuit is provided with a pair of potentiometers having sliders and center taps through which the auxiliary potentials are supplied to the circuit.

8. In a magnetic analysis apparatus the combination which comprises an exciter coil disposable in inductive relationship with a magnetizable body, means for energizing the exciter coil with an alternating current, a secondary coil disposed in inductive relationship with the exciter coil and connected to a circuit containing means for introducing into the circuit a plurality of auxiliary alternating potentials of the same frequency as that supplied to the exciter coil but displaced from each other by substantially constant phase angles, and means for determining changes of phase and amplitude of an alternating potential in said circuit.

THEODOR ZUSCHLAG.